United States Patent
Veine et al.

(10) Patent No.: US 9,731,633 B2
(45) Date of Patent: Aug. 15, 2017

(54) RECLINER MECHANISM

(71) Applicant: Lear Corporation, Southfield, MI (US)

(72) Inventors: Eric Veine, Wixon, MI (US); Peter Robert McCulloch, Grosse Pointe Woods, MI (US)

(73) Assignee: Lear Corporation, Southfield, MI (US)

( * ) Notice: Subject to any disclaimer, the term of this patent is extended or adjusted under 35 U.S.C. 154(b) by 53 days.

(21) Appl. No.: 14/804,460

(22) Filed: Jul. 21, 2015

(65) Prior Publication Data

US 2017/0020289 A1   Jan. 26, 2017

(51) Int. Cl.
*B60N 2/235*   (2006.01)

(52) U.S. Cl.
CPC .......... *B60N 2/235* (2013.01); *B60N 2/2356* (2013.01)

(58) Field of Classification Search
CPC ...... B60N 2/2354; B60N 2/2356; A47C 1/026
See application file for complete search history.

(56) References Cited

U.S. PATENT DOCUMENTS

| | | |
|---|---|---|
| 6,332,649 B1 | 12/2001 | Vossmann |
| 6,474,740 B1 * | 11/2002 | Kondo .................. B60N 2/236 297/367 R |
| 6,561,585 B2 | 5/2003 | Cilliere et al. |
| 6,634,713 B2 | 10/2003 | Nonomiya et al. |
| 6,749,263 B2 | 6/2004 | Peters |
| 7,055,906 B2 | 6/2006 | Shinozaki |
| 7,360,838 B2 | 4/2008 | Smuk |
| 7,380,882 B2 | 6/2008 | Oki |
| 7,497,519 B2 | 3/2009 | Dill et al. |
| 7,578,557 B2 | 8/2009 | Becker et al. |
| 7,614,700 B2 | 11/2009 | Peters |
| 7,648,205 B2 | 1/2010 | Zou et al. |
| 7,677,667 B2 | 3/2010 | Peters et al. |
| 7,828,386 B2 | 11/2010 | Reubeuze et al. |
| 7,922,250 B2 | 4/2011 | Rohee |
| 7,950,741 B2 | 5/2011 | Mitsuhashi |
| 8,201,888 B2 | 6/2012 | Fassbender et al. |
| 8,262,165 B2 * | 9/2012 | Mitsuhashi .......... B60N 2/2252 297/362 |
| 8,430,454 B2 | 4/2013 | Tanguy et al. |
| 8,449,034 B2 | 5/2013 | Tame et al. |
| 8,459,743 B2 | 6/2013 | Villarroel |
| 8,585,149 B2 | 11/2013 | Villarroel et al. |
| 8,616,648 B2 | 12/2013 | Holzhueter et al. |
| 8,616,649 B2 | 12/2013 | Uramichi et al. |
| 8,668,269 B2 | 3/2014 | Jaudouin et al. |
| 8,672,407 B2 | 3/2014 | Leconte et al. |
| 8,702,172 B2 | 4/2014 | Schmodde et al. |

(Continued)

FOREIGN PATENT DOCUMENTS

| | | |
|---|---|---|
| DE | 102005021356 A1 | 11/2006 |
| WO | 2006117330 A1 | 11/2006 |

OTHER PUBLICATIONS

U.S. Appl. No. 14/618,193, filed Feb. 10, 2015.

*Primary Examiner* — Timothy J Brindley
(74) *Attorney, Agent, or Firm* — Brooks Kushman P.C.

(57) ABSTRACT

A recliner mechanism for a seat. The recliner mechanism may include a first plate, a second plate, a set of pawls, and a driver. The driver may actuate the set of pawls when the driver rotates about the axis. A dump ramp protrusion may be provided to inhibit movement of the pawls from a refracted position to a locked position.

20 Claims, 9 Drawing Sheets

(56) References Cited

U.S. PATENT DOCUMENTS

| | | |
|---|---|---|
| 8,720,999 B2 | 5/2014 | Peters |
| 8,746,796 B2 | 6/2014 | Wei |
| 8,985,689 B2 | 3/2015 | McCulloch et al. |
| 9,315,121 B2 * | 4/2016 | Enokijima ............ B60N 2/2213 |
| 2003/0025377 A1 * | 2/2003 | Peters .................... B60N 2/236 297/367 R |
| 2008/0001458 A1 * | 1/2008 | Hoshihara ............ B60N 2/0232 297/362 |
| 2008/0303331 A1 | 12/2008 | Heo |
| 2009/0243363 A1 * | 10/2009 | Tarusawa ............... B60N 2/236 297/367 P |
| 2009/0289488 A1 * | 11/2009 | Mitsuhashi .......... B60N 2/2227 297/354.12 |
| 2010/0295352 A1 | 11/2010 | Flucht et al. |
| 2011/0006583 A1 * | 1/2011 | Schwarze ............. B60N 2/206 297/463.1 |
| 2011/0025114 A1 * | 2/2011 | Berndtson ............. B60N 2/206 297/367 P |
| 2011/0127821 A1 | 6/2011 | Wojatzki et al. |
| 2011/0254338 A1 | 10/2011 | Fisher, III et al. |
| 2012/0169105 A1 | 7/2012 | Assmann et al. |
| 2012/0313416 A1 * | 12/2012 | Hiemstra ............... B60N 2/236 297/354.1 |
| 2013/0187426 A1 | 7/2013 | Nagura et al. |
| 2013/0214578 A1 | 8/2013 | Stilleke et al. |
| 2013/0270883 A1 | 10/2013 | Becker et al. |
| 2013/0300175 A1 | 11/2013 | Peters |
| 2014/0077561 A1 | 3/2014 | Sasaki |
| 2014/0091607 A1 * | 4/2014 | Maeda ................... A47C 1/024 297/354.12 |
| 2014/0097659 A1 | 4/2014 | Wahls et al. |
| 2014/0210242 A1 | 7/2014 | Schueler et al. |
| 2014/0225411 A1 | 8/2014 | Matt |
| 2014/0239691 A1 * | 8/2014 | Hellrung ............... B60N 2/2356 297/354.1 |
| 2015/0015044 A1 * | 1/2015 | Teufel .................. B60N 2/2356 297/366 |
| 2015/0035339 A1 * | 2/2015 | Endou ................... B60N 2/236 297/367 R |
| 2015/0069809 A1 * | 3/2015 | Matt .................... B60N 2/2252 297/366 |
| 2015/0165936 A1 * | 6/2015 | Wei ....................... B60N 2/236 297/367 P |
| 2015/0321585 A1 | 11/2015 | McCulloch et al. |

* cited by examiner

RECLINER MECHANISM

TECHNICAL FIELD

This application relates to a seat assembly and a recliner mechanism for a seat assembly.

BACKGROUND

A recliner mechanism is disclosed in U.S. Pat. No. 8,985,689.

SUMMARY

In at least one embodiment, a recliner mechanism is provided. The recliner mechanism may include a first plate, a second plate, a set of pawls, and a unitary driver. The first plate may have a set of pawl slots, a ring groove, and a set of pawl tooth openings. The ring groove may extend around the set of pawl slots. The set of pawl tooth openings that may extend from the ring groove and may be disposed opposite the set of pawl slots. The second plate may be rotatable about an axis with respect to the first plate. The second plate may have a center hole that may extend through the second plate and a set of teeth that may be received in the ring groove. Each pawl may be received in a corresponding pawl slot. The unitary driver may be at least partially received in the center hole and may engage each member of the set of pawls. The driver may actuate the set of pawls when the driver rotates about the axis.

In at least one embodiment, a recliner mechanism is provided. The recliner mechanism may include a first plate, a second plate, a set of pawls, and a driver. The first plate may have a center hole, a ring groove, a set of pawl slots, and a set of pawl tooth openings. The center hole may extend through the first plate. The ring groove may extend around the center hole. The set of pawl slots may extend from the ring groove toward the center hole. The set of pawl tooth openings may extend from the ring groove toward an outer surface of the first plate. The second plate may be rotatable about an axis with respect to the first plate. The second plate may have a center hole and a set of teeth that may be received in the ring groove. Each pawl may be received in a corresponding pawl slot and may have a cam pin. The driver may actuate the set of pawls when the driver rotates about the axis. The driver may include a shaft portion, a cover portion, and a flange portion. The shaft portion may extend through the center hole of the first plate and may be disposed in the center hole of the second plate. The cover portion may be disposed in the center hole of the second plate and may extend around the axis. The cover portion may extend from an end of the shaft portion. The flange portion may extend from the cover portion and may be disposed between the first plate and the second plate. The flange portion may have a set of pawl actuation openings that may each receive a cam pin of a corresponding member of the set of pawls.

In at least one embodiment, a recliner mechanism is provided. The recliner mechanism may have a first plate, a second plate, a set of pawls, and a driver. The first plate may have a ring groove, a set of pawl slots disposed adjacent to the ring groove, and a set of pawl tooth openings disposed adjacent to the ring groove. The second plate may be rotatable about an axis with respect to the first plate. The second plate may have a center hole, a dump ramp protrusion, and a set of teeth. The dump ramp protrusion may be completely spaced apart from the center hole. The set of teeth may be received in the ring groove. Each pawl may be received in a corresponding pawl slot. The driver may actuate the set of pawls when the driver rotates about the axis. The set of pawls may move between a locked position and a retracted position. The second plate may be inhibited from rotating about the axis when the set of pawls are in the locked position. The set of pawls may be retracted toward the axis and may not extend into the ring groove when in the refracted position. The set of pawls may be inhibited from moving from the retracted position to the locked position when the dump ramp protrusion inhibits at least one member of the set of pawls from moving away from the axis.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figures 1, 2:
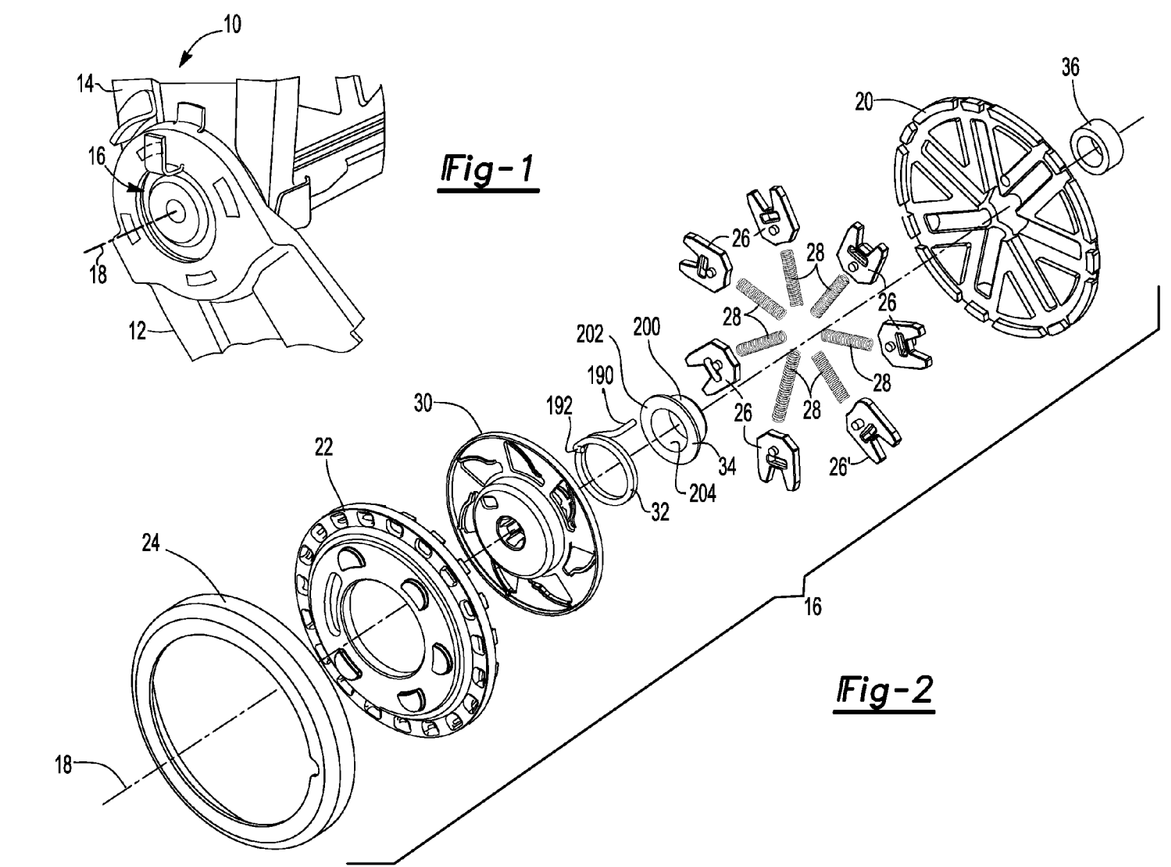
FIG. 1 is a perspective view of a portion of a seat assembly having a recliner mechanism.
FIG. 2 is an exploded view of the recliner mechanism.

Referring to FIG. 1, a portion of a seat assembly 10 is shown. The seat assembly 10 may have a seat bottom 12, a seat back 14, and a recliner mechanism 16. The recliner mechanism 16 may be configured to control pivoting of the seat back 14 about an axis of rotation or axis 18 with respect to the seat bottom 12. One or more recliner mechanisms 16 may be provided with the seat assembly 10. For example, a pair of recliner mechanisms 16 may be disposed along opposing lateral sides of the seat back 14 to selectively permit or inhibit pivoting of the seat back 14.

Referring to FIG. 2, an exploded view of the recliner mechanism 16 is shown. The recliner mechanism 16 may include a first plate 20, a second plate 22, a retainer ring 24, a set of pawls 26, a set of pawl springs 28, a driver 30, a biasing member 32, a bushing 34, and a clip 36.

Figure 3:
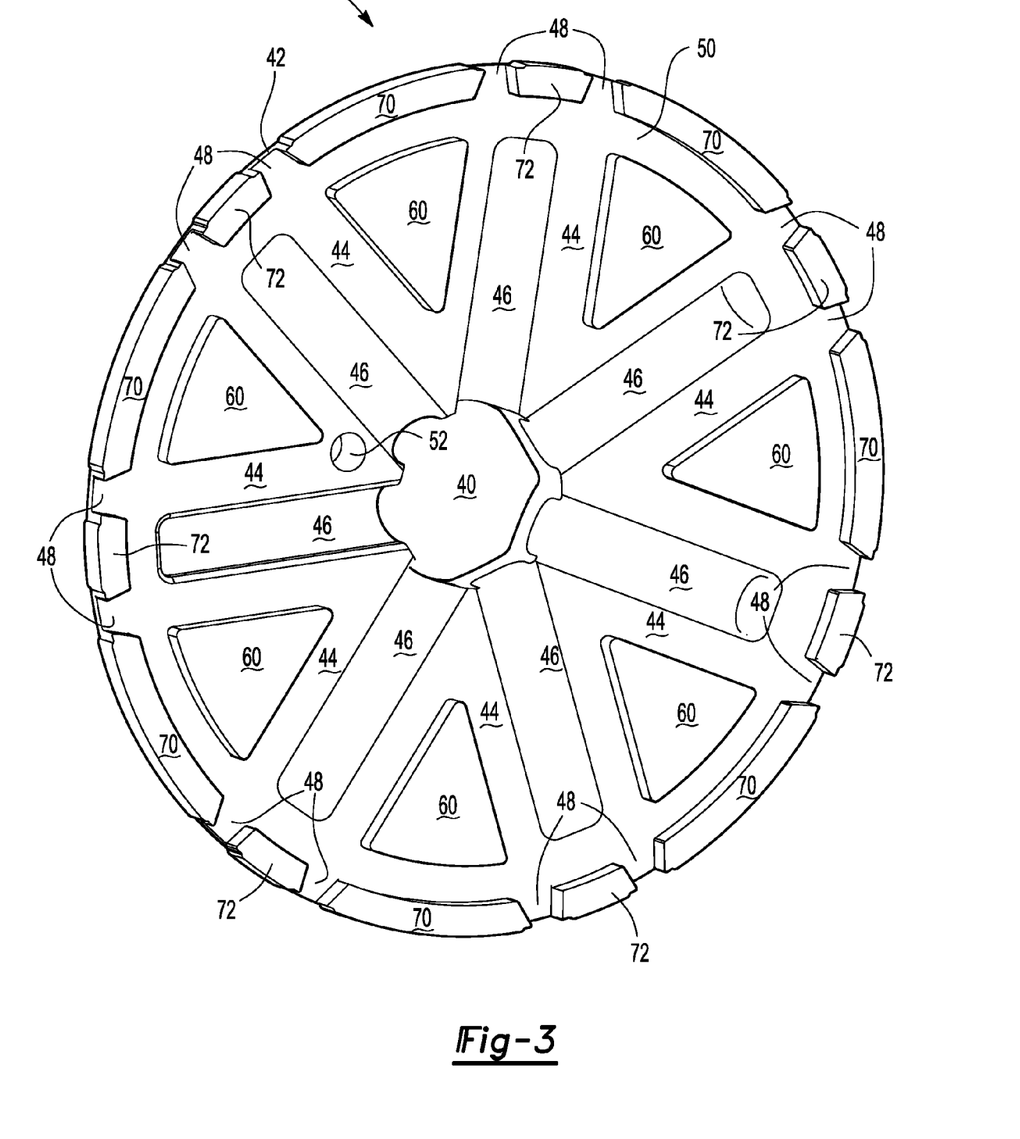
FIG. 3 is a perspective view of a first plate that may be provided with the recliner mechanism.

Referring to FIGS. 2 and 3, an example of a first plate 20 is shown. The first plate 20 may be adapted to be mounted to the seat assembly 10. For instance, the first plate 20 may be fixedly positioned on or with respect to the seat bottom 12. In at least one embodiment, the first plate 20 may be generally configured as a circular disc and may include a center hole 40, an outer surface 42, a set of pawl slots 44, a plurality of spring slots 46, a set of pawl tooth openings 48, a ring groove 50, and a mounting hole 52.

The center hole 40 may receive the driver 30 and the bushing 34 and may allow the driver 30 to rotate about the axis 18. In at least one embodiment, the center hole 40 may be disposed at the center of the first plate 20 and may be radially disposed about the axis 18. The center hole 40 may be a through hole that may extend through the first plate 20.

The outer surface 42 may be disposed opposite the center hole 40 and may face toward and may engage the retainer ring 24. In at least one embodiment, the outer surface 42 may be radially disposed with respect to the axis 18 and may at least partially define an outside circumference of the first plate 20.

The set of pawl slots 44 may be provided in a side or surface of the first plate 20 that faces toward the second plate 22. In FIG. 2, seven pawl slots 44 are shown, although it is contemplated that a different number of pawl slots 44 may be provided. Each pawl slot 44 may be configured to receive and guide movement of a corresponding pawl 26. The pawl slots 44 may be disposed between the center hole 40 and the ring groove 50 and may extend radially with respect to the axis 18. As such, the pawl slots 44 may extend from the ring groove 50 toward the center hole 40. In at least one embodiment, the pawl slots 44 may be spaced apart from each other and may be located between one or more guide features 60 that may extend from the first plate 20.

A spring slot 46 may be provided in or provided adjacent to each pawl slot 44. Each spring slot 46 may be configured to receive a pawl spring 28. Each spring slot 46 may be configured as a recess in the first plate 20 that may extend radially with respect to the axis 18 and may be located between the center hole 40 and the ring groove 50. In FIG. 3, the spring slot 46 extends from the center hole 40 toward the ring groove 50.

The set of pawl tooth openings 48 may be arranged such that each pawl tooth opening 48 is aligned with a corresponding pawl slot 44. For example, a pawl tooth opening 48 may be disposed on the opposite side of the ring groove 50 from each pawl slot 44. Each pawl tooth opening 48 may be disposed proximate or adjacent to the outer surface 42 of the first plate 20 and may extend to or toward the ring groove 50. For instance, the pawl slots 44 may extend from the ring groove 50 toward or to the outer surface 42. In the embodiment shown, two pawl tooth openings 48 are aligned with each pawl slot 44 and disposed on the opposite sides of a spacer tooth 70; however, it is contemplated that a greater or lesser number of pawl slots 44 and/or spacer teeth 70 may be provided. Each pawl tooth opening 48 may be configured to receive a corresponding pin on a pawl 26 when the pawl 26 is fully extended away from center hole 40 as will be discussed in more detail below. In addition, a second spacer tooth 72 may be provided between pawl tooth openings 48 that are aligned with different pawl slots 44 or that receive different pawls 26. The second spacer tooth 72 may be wider or larger than the first spacer tooth 70.

The ring groove 50 may receive a portion of the second plate 22 and may facilitate rotation of the second plate 22 as will be discussed in more detail below. The ring groove 50 may be configured as a ring that may extend around the first plate 20. For example, the ring groove 50 may be radially disposed with respect to the axis 18 and may extend continuously around the axis 18 and the center hole 40. The ring groove 50 may be disposed between and may be spaced apart from the center hole 40 and the outer surface 42. In FIGS. 2 and 3, the ring groove 50 is disposed between each pawl slot 44 and the set of pawl tooth openings 48. As such, the ring groove 50 may be disposed adjacent to and may intersect or extend from each pawl slot 44 and corresponding members of the set of pawl tooth openings 48.

The mounting hole 52 may be configured to receive the facilitate mounting of the biasing member 32. For example, the mounting hole 52 may receive a first end of the biasing member 32. The mounting hole 52 may extend partially or completely through the first plate 20 and may be disposed adjacent to the bushing 34.

Figure 4:
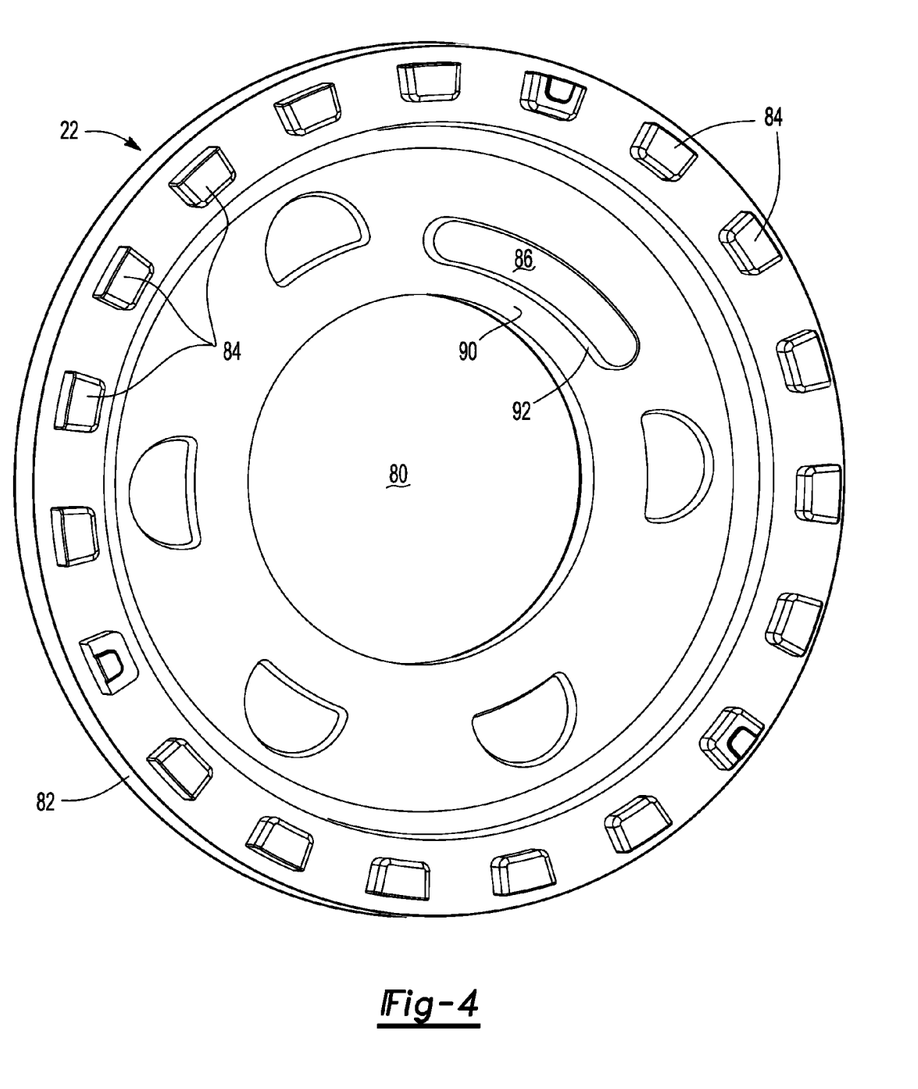
FIG. 4 is a perspective view of a second plate that may be provided with the recliner mechanism.

Referring to FIGS. 2 and 4, an example of a second plate 22 is shown. The second plate 22 may be configured to rotate about the axis 18 with respect to the first plate 20. In at least one embodiment, the second plate 22 may include a center hole 80, an outside surface 82, a set of teeth 84, and a dump ramp protrusion 86.

The center hole 80 may receive the driver 30 such that the driver 30 may rotate about the axis 18. In at least one embodiment, the center hole 80 may be disposed at the center of the second plate 22 and may be radially disposed about the axis 18. The center hole 80 may be a through hole that may extend through the second plate 22.

The outside surface 82 may be disposed opposite the center hole 80 and may face toward the retainer ring 24. In at least one embodiment, the outside surface 82 may be radially disposed with respect to the axis 18 and may at least partially define an outside diameter or outside circumference of the second plate 22. The second plate 22 may have a smaller diameter than the first plate 20.

Figure 12:
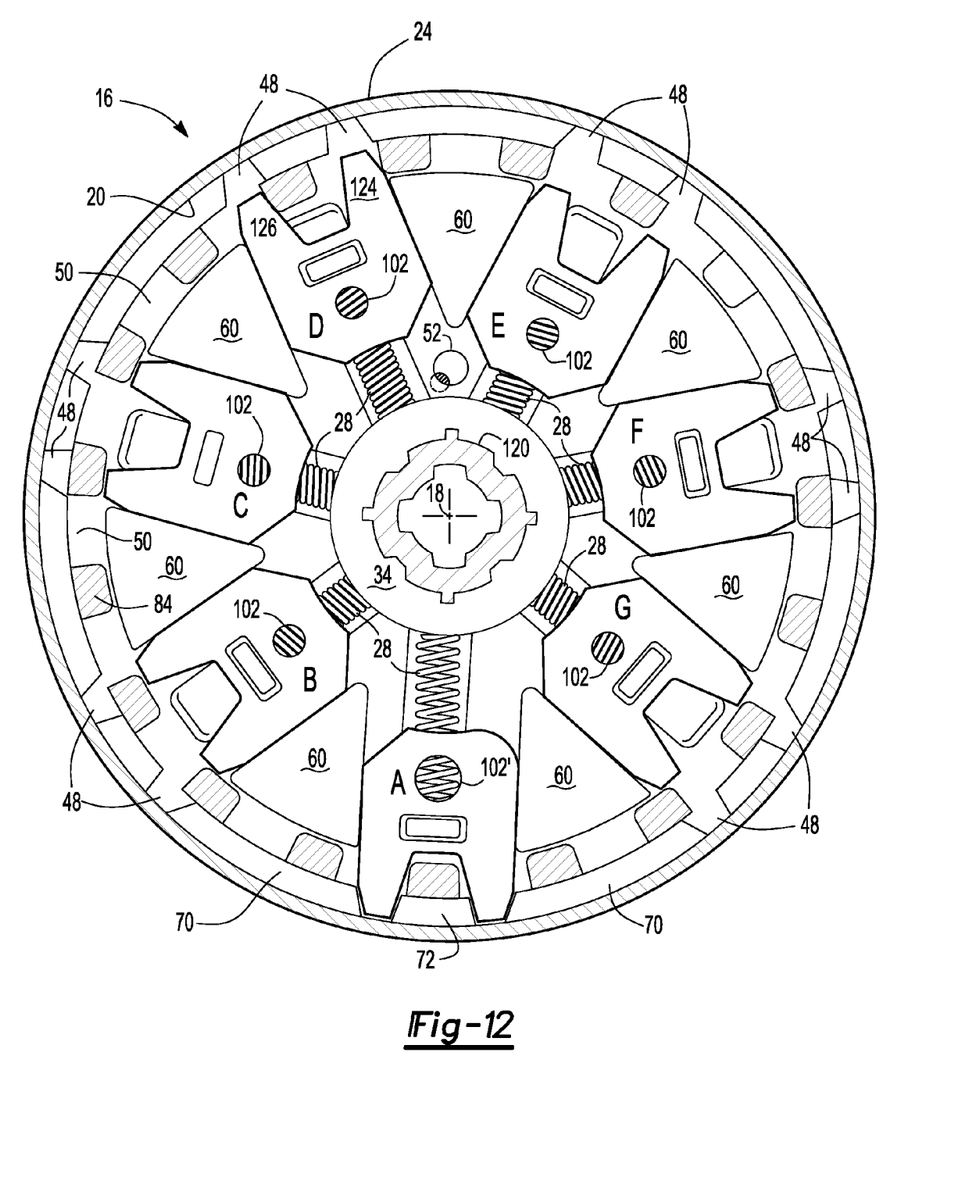
FIG. 12 is a section view of a recliner mechanism that illustrates exemplary pawl positions.

The set of teeth 84 may be disposed between the outside surface 82 and the center hole 80. For instance, the teeth 84 may be disposed proximate or adjacent to the outside surface 82 and may extend from an interior surface or interior side of the second plate 22 that may face toward the first plate 20 toward the first plate 20. As such, the set of teeth 84 may extend generally parallel to the axis 18. The teeth 84 may be spaced apart from each other and provided in repeating arrangement. For example, the teeth 84 may be radially disposed with respect to the axis 18 and may be received in the ring groove 50 as best shown in FIG. 12. For clarity, only a portion of the set of teeth 84 are labeled in FIG. 4.

The dump ramp protrusion 86 may extend from the interior side or interior surface 90 of the second plate 22 toward the first plate 20 and the driver 30. The dump ramp protrusion 86 may be disposed between the center hole 80 and the set of teeth 84. The dump ramp protrusion 86 may have an inner surface 92 that may face toward the axis 18. The inner surface 92 may extend along an arc or curve and may be concave with respect to the axis 18. In addition, the inner surface 92 may be positioned at a substantially constant radial distance from the axis 18 in one or more embodiments. The dump ramp protrusion 86 may be completely spaced apart from the center hole 80 by a portion of the interior surface 90 that may extend between the inner surface 92 and the center hole 80. The dump ramp protrusion 86 may not extend completely around the center hole 80, but instead may be localized along an acute angle or segment of the inner surface 92. The dump ramp protrusion 86 may cooperate with a pawl 26 to hold the driver 30 in a recliner open position as will be discussed in more detail below.

Referring to FIG. 2, the retainer ring 24 may help secure the second plate 22 between the first plate 20 and the retainer ring 24. For example, the retainer ring 24 may be fixedly disposed on the first plate 20 and may not be fixedly disposed on the second plate 22. As such, the second plate 22 may be received between the retainer ring 24 and the first plate 20 and may rotate about the axis 18 with respect to the retainer ring 24 and first plate 20. The retainer ring 24 may be fixedly disposed on the first plate 20 in any suitable manner, such as by welding, an interference fit, or by the use of one or more fasteners.

Figure 10:
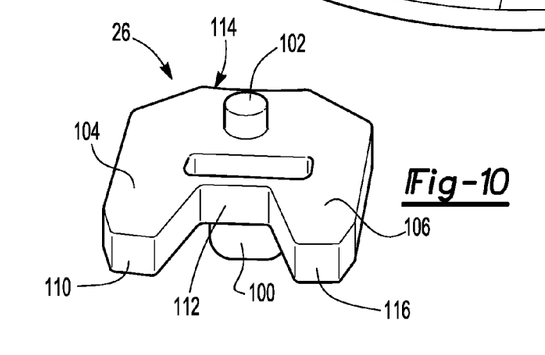
FIG. 10 is a perspective view of a pawl that may be provided with the recliner mechanism.
Figure 11:
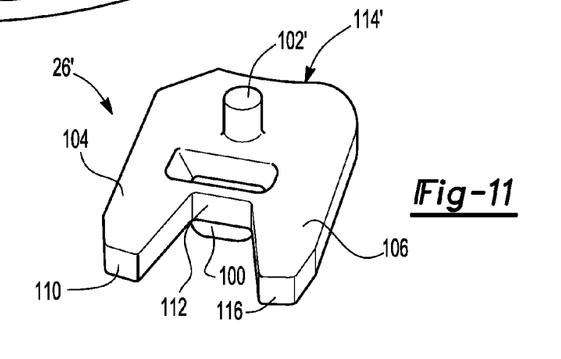
FIG. 11 is a perspective view of another pawl that may be provided with the recliner mechanism.

Referring to FIGS. 2, 10 and 11, the set of pawls 26 will now be described in more detail. The pawls 26 may be disposed between the first plate 20 and the second plate 22. Each pawl 26 may be received in a corresponding pawl slot 44 and may be configured to move along a radial line between a retracted position and a fully extended position. In the retracted position, a pawl 26 may be actuated toward the axis 18 to permit the second plate 22 to rotate with respect to the first plate 20. In the fully extended position, a pawl 26 may be actuated away from the axis 18 to inhibit rotation of the second plate 22 as will be discussed in more detail below. Each pawl 26 may include a spring pin 100, a cam pin 102, a master pin 104, and a slave pin 106.

The spring pin 100 may be disposed near the center of each pawl 26 and may extend toward the first plate 20. More specifically, the spring pin 100 may extend into a corresponding spring slot 46 such that the spring pin 100 may engage a corresponding pawl spring 28.

The cam pin 102 may extend toward the second plate 22 or in an opposite direction from the spring pin 100. The cam pin 102 may be disposed near the center of each pawl 26 or along a center axis of each pawl 26. The cam pin 102 may be disposed closer to the axis 18 than the spring pin 100. The cam pin 102 of each pawl 26 may engage the driver 30. For example, each cam pin 102 may extend into a corresponding pawl actuation opening of the driver 30 where it may engage one or more surfaces of the driver 30 that define the pawl actuation opening. From the perspective shown in FIGS. 2 and 7, rotation of the driver 30 in a counterclockwise direction about the axis 18 may retract any pawl 26 that is in an extended position. More specifically, sufficient counterclockwise rotation of the driver 30 may cause the cam pin 102 of any extended pawl 26 to follow a first ramp surface and a second ramp surface of the pawl actuation opening, thereby actuating the pawl 26 toward the axis 18 and ultimately to the position shown in FIG. 8.

The master pin 104 may extend away from the axis 18 and may be slightly larger than the slave pin 106. As such, the master pin 104 may be configured to wedge against a tooth 84 on the second plate 22 to help eliminate chuck when two pawls 26 are extended and engaged between teeth 84. The master pin 104 may have a tapered configuration in which the master pin 104 is narrower near an end surface 110 than near an intermediate surface 112 that may extend between the master pin 104 and the slave pin 106. The end surface 110 may be spaced apart from the first plate 20, the second plate 22, and/or the retainer ring 24 when the pawl 26 is retracted or extended.

The slave pin 106 may be spaced apart from the master pin 104. The slave pin 106 may provide additional strength for inhibiting rotation of the second plate 22 with respect to the first plate 20. Like the master pin 104, the slave pin 106 may have a tapered configuration in which the slave pin 106 is narrower near an end surface 116 than near the intermediate surface 112. The end surface 116 may be spaced apart from the first plate 20, the second plate 22, and/or the retainer ring 24 when the pawl 26 is retracted or extended.

The master pin 104 may be spaced apart from the slave pin 106 such that the master pin 104 and slave pin 106 do not simultaneously engage a tooth 84 that is disposed between the master pin 104 and slave pin 106. The master pin 104 and the slave pin 106 may be disposed opposite a rear surface 114 that may face toward the axis 18.

Referring to FIG. 11, another pawl configuration is shown. The pawl 26' in FIG. 11 is similar to the pawl 26 shown in FIG. 10, but may have a cam pin 102' that has a slightly larger diameter and may have an asymmetrical rear surface 114' that may be disposed opposite the master pin 104 and the slave pin 106. In addition, the cam pin 102' may have a greater length than the cam pin 102 of the pawl 26 in FIG. 10 such that the cam pin 102' may extend through a pawl actuation opening in the driver 30 to engage the inner surface 92 of the dump ramp protrusion 86. The rear surface 114' may have a greater length than the rear surface 114 of the pawl 26 in FIG. 10. For example, the rear surface 114' may extend behind the slave pin 106 and may be disposed opposite its end surface 116.

Referring to FIG. 2, each pawl spring 28 or each member of the set of pawl springs 28 may independently bias or urge a corresponding pawl 26, 26' in a direction that extends away from the axis 18. Each pawl spring 28 may be received in a corresponding spring slot 46 and may have a first end that may engage the spring pin 100 and a second end that may engage the bushing 34.

Figure 5:
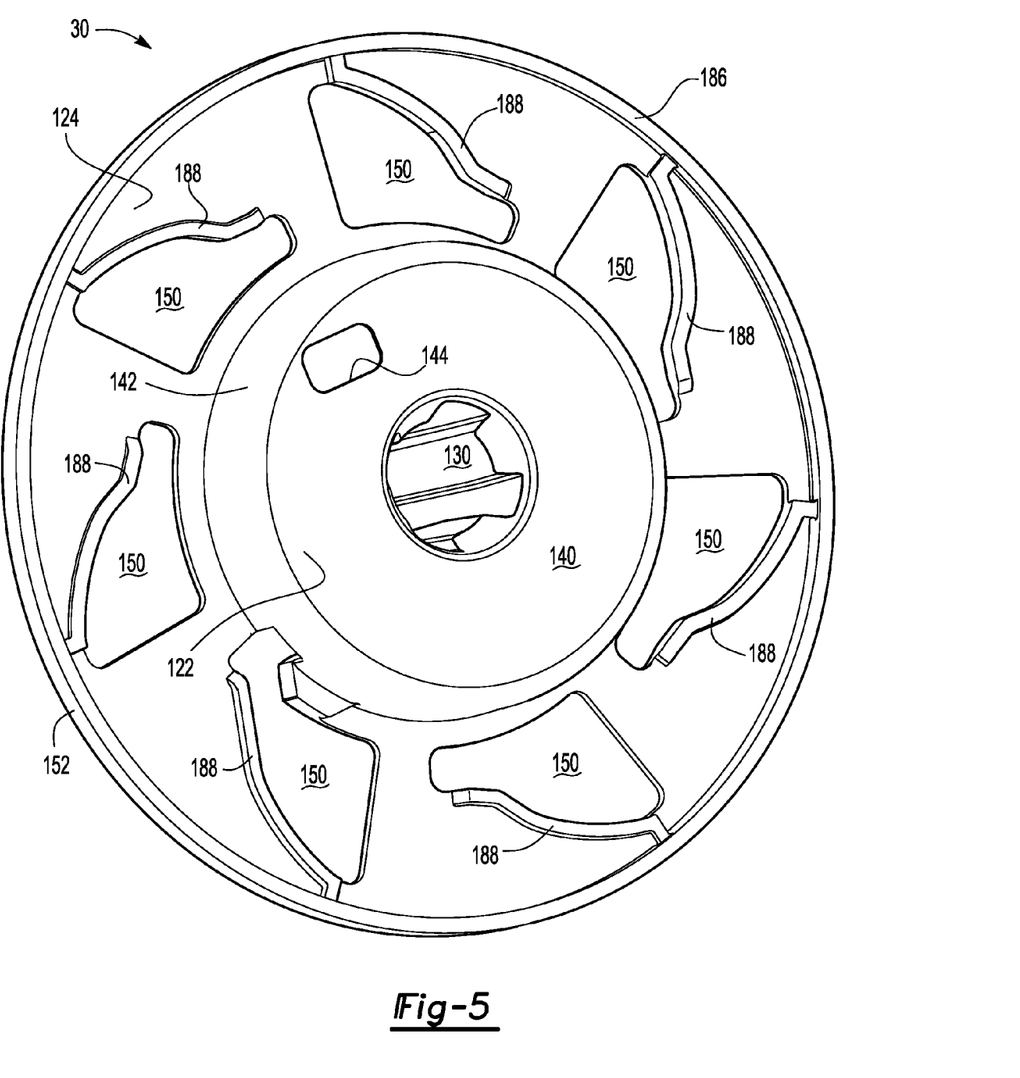
FIGS. 5 and 6 are perspective views of a driver that may be provided with the recliner mechanism.
Figure 6:
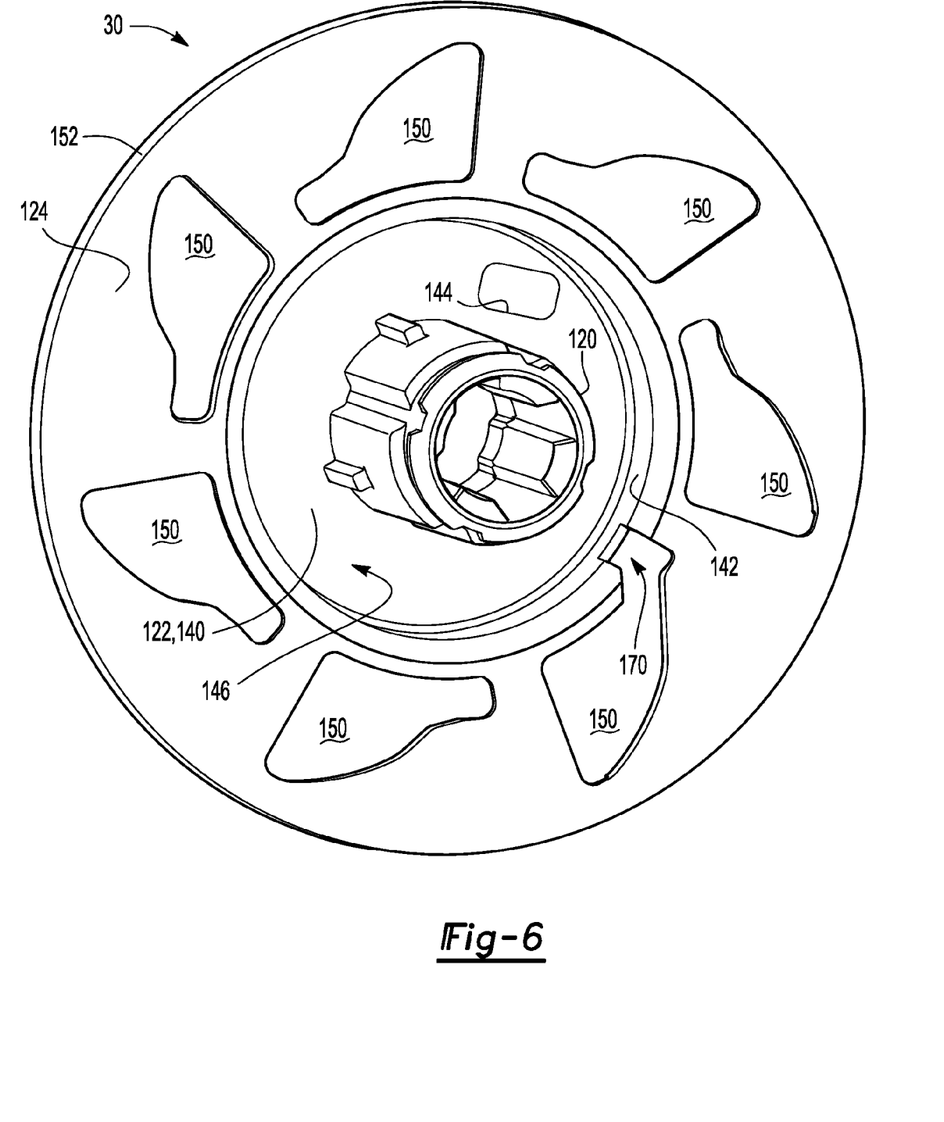

Referring to FIGS. 5 and 6, the driver 30 may be configured to rotate about the axis 18 to actuate the pawls 26 as will be discussed in more detail below. The driver 30 may be provided as a single unitary or one-piece component that may directly actuate the pawls 26, 26' without any intervening component, such as a cam disc. For example, the driver 30 may be single component that may be made of a polymeric material or a metal alloy, such as a cast metal alloy. The driver 30 may be received in and may extend through the center hole 40 of the first plate 20. The driver 30 may also be at least partially received in the center hole 80 of the second plate 22. In at least one embodiment, the driver 30 may include a shaft portion 120, a cover portion 122, and a flange portion 124.

The shaft portion 120 may be disposed proximate the center of the driver 30. The shaft portion 120 may generally extend through the recliner mechanism 16. For example, the shaft portion 120 may be received in the center hole 40 of the first plate 20 and the center hole 80 of the second plate 22. In addition, the shaft portion 120 may extend completely through the center hole 40 of the first plate 20 to facilitate coupling to the clip 36. The shaft portion 120 may be disposed about the axis 18 and may define a center hole 130. The center hole 130 may extend along the axis 18 and may receive an input shaft that may rotate the driver 30 about the axis 18.

The cover portion 122 may extend from the shaft portion 120. The cover portion 122 may be at least partially disposed in the center hole 80 of the second plate 22, but may not be disposed in the center hole 40 of the first plate 20. In at least one embodiment, the cover portion 122 may include a first cover portion wall 140 and a second cover portion wall 142.

The first cover portion wall 140 may extend from the shaft portion 120. For example, the first cover portion wall 140 may be disposed in the center hole 80 of the second plate 22 and may extend from the shaft portion 120 in a direction that extends away from the axis 18. In at least one embodiment, the first cover portion wall 140 may extend substantially perpendicular to the axis 18 from an end of the shaft portion 120. The first cover portion wall 140 may include a cover portion mounting hole 144. The cover portion mounting hole 144 may receive an end of the biasing member 32. The cover portion mounting hole 144 may be disposed between the shaft portion 120 and the second cover portion wall 142.

The second cover portion wall 142 may extend from the first cover portion wall 140 to the flange portion 124. For example, the second cover portion wall 142 may extend from an end of the first cover portion wall 140 to an end of the flange portion 124. The second cover portion wall 142 may extend around the axis 18 in a ring-like manner and may be disposed substantially perpendicular to the first cover portion wall 140 and the flange portion 124 in one or more embodiments. The second cover portion wall 142 may be disposed proximate and may engage a surface of the second plate 22 that may define the center hole 80 and may be spaced apart from the shaft portion 120 to help define a cavity 146 that may receive the biasing member 32.

The flange portion 124 may extend from the cover portion 122. For example, the flange portion 124 may extend from an end of the cover portion 122 in an outward direction that may extend away from the axis 18 and toward the set of teeth 84 of the second plate 22. In addition, the flange portion 124 may be completely spaced apart from the shaft portion 120. The flange portion 124 may be disposed between the first plate 20 and the second plate 22. The flange portion 124 may have a set of pawl actuation openings 150.

The pawl actuation openings 150 may be arranged around the axis 18 and may be positioned between the second cover portion wall 142 and an outside surface or outside circumferential surface 152 of the flange portion 124. Each member of the set of pawl actuation openings 150 may receive a cam pin 102, 102' of a corresponding member of the set of pawls. Moreover, each pawl actuation opening 150 may be configured to guide movement of a corresponding pawl 26, 26' when the driver 30 is rotated about the axis 18, such as when a pawl 26, 26' is refracted.

Figure 9:
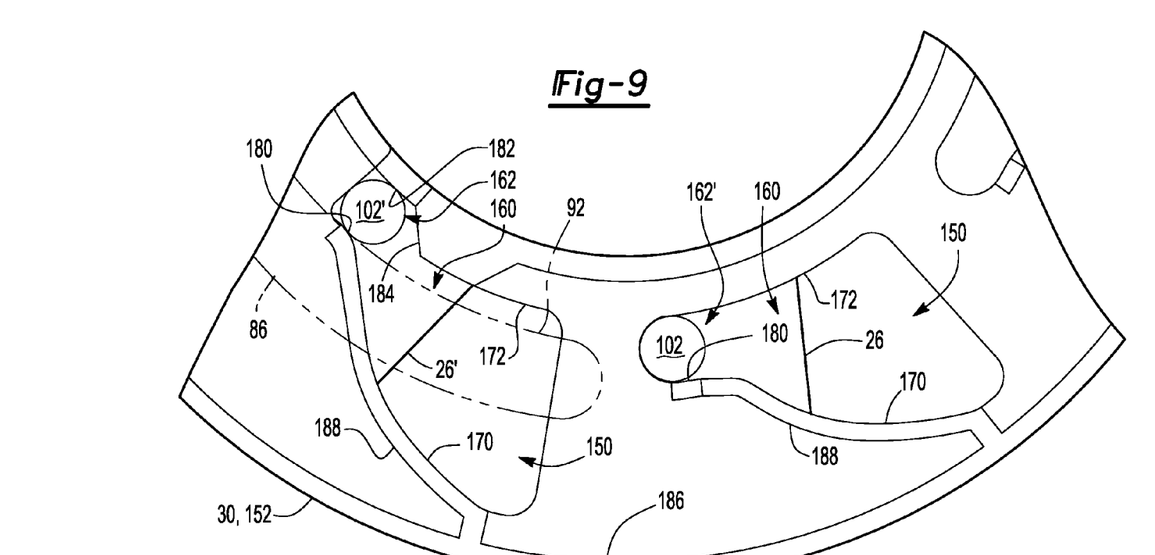
FIG. 9 is a magnified view of a portion of the recliner mechanism shown in FIG. 8.

Referring to FIG. 9, the pawl actuation openings 150 may be provided in multiple configurations or different configurations. For example, at least one pawl actuation opening 150 may have the configuration shown to the left in FIG. 9 while the remaining pawl actuation openings 150 may have the configuration shown to the right in FIG. 9.

The pawl actuation opening 150 has a first opening portion 160 and a second opening portion 162. The first opening portion 160 may include a first ramp surface 170 and a first bottom surface 172.

The first ramp surface 170 that may engage and guide movement of a corresponding pawl 26, 26'. The first ramp surface 170 may generally be concave with respect to the axis 18.

The first bottom surface 172 may be disposed opposite the first ramp surface 170. The first bottom surface 172 may be spaced apart from the first ramp surface 170 and may be disposed closer to the axis 18 than the first ramp surface 170. The first bottom surface 172 may be radially disposed or disposed at a substantially constant radial distance from the axis 18 in one or more embodiments.

The second opening portion 162 may be disposed adjacent to the first opening portion 160. The second opening portion 162 may be smaller than the first opening portion 160 and may be slightly larger than a cam pin 102 on the pawl 26 as will be discussed in more detail below. The second opening portion 162 may have a second ramp surface 180 and a second bottom surface 182 that may cooperate to at least partially define a notch 184.

The second ramp surface 180 may extend from an end of the first ramp surface 170. The second ramp surface 180 may engage a cam pin 102, 102' and inhibit movement of a corresponding pawl 26. 26' away from the axis 18 as will be discussed in more detail below. The second ramp surface 180 may be disposed further from the axis 18 than the first bottom surface 172. In addition, the second ramp surface 180 and the inner surface 92 of the dump ramp protrusion 86 may be disposed at approximately the same distance from the axis 18. The second ramp surface 180 may be disposed substantially parallel to the second bottom surface 182 in one or more embodiments.

The second bottom surface 182 may be disposed opposite the second ramp surface 180 and may be disposed closer to the axis 18 than the second ramp surface 180 and the first bottom surface 172. As such, the second bottom surface 182 may allow a cam pin 102' to be received in the notch 184 such that the dump ramp protrusion 86 may move over the cam pin 102' to inhibit the pawls 26, 26' from extending away from the axis 18. The second bottom surface 182 may be radially disposed or disposed at a substantially constant radial distance from the axis 18 in one or more embodiments.

The notch 184 may allow a corresponding pawl 26' to be retracted further than the other pawls 26 (i.e., move into the notch 184 and thus move further toward the axis 18 than the other pawls 26) when the driver 30 is rotated counterclockwise from the perspective shown. In addition, the notch 184 and dump ramp protrusion 86 may cooperate to hold the recliner mechanism 16 in a recliner open position. More specifically, the notch 184 and dump ramp protrusion 86 may cooperate to hold a cam pin 102' of a pawl 26' in the notch 184 as will be discussed in more detail below.

Referring to FIG. 5, the driver 30 may also include a reinforcement ring 186 and one or more reinforcement ribs 188. The reinforcement ring 186 may extend around the driver 30 and the pawl actuation openings 150 in a ring-line manner and may be disposed proximate the circumferential surface 152. A reinforcement rib 188 may extend from the reinforcement ring 186 toward a pawl actuation opening 150. The reinforcement rib 188 may extend along the first ramp surface 170 and the second ramp surface 180 to help inhibit flexing of the flange portion 124 and provide additional surface area that may engage a cam pin 102, 102'.

At the right in FIG. 9, another example of a pawl actuation opening 150 is shown. In this embodiment, no notch is provided in the second opening portion 162'. The first bottom surface 172 may be the bottom surface for the first opening portion 160 and the second opening portion 162'. As such, a cam pin 102 of a pawl 26 may not be captured in the second opening portion 162' by the dump ramp protrusion 86. The first bottom surface 172 may be disposed at a substantially constant radial distance from the axis 18.

The biasing member 32 may be disposed between the driver 30 and the first plate 20. For example, the biasing member 32 may be disposed between the first plate 20 and the first cover portion wall 140 or between the bushing 34 and the first cover portion wall 140. The biasing member 32 may also be disposed inside the cover portion 122 of the driver 30 in the cavity 146. For instance, the biasing member 32 may be disposed between the shaft portion 120 and the flange portion 124 or between the shaft portion 120 and the second cover portion wall 142. In at least one embodiment, the biasing member 32 may be configured as a coil spring that may extend around the shaft portion 120.

The biasing member 32 may exert a biasing force on the driver 30 that may bias the driver 30 in a clockwise direction about the axis 18 from the perspective shown in FIG. 2. The biasing member 32 may have a first end 190 and a second end 192. The first end 190 may be coupled to the first plate 20. For example, the first end 190 may be received in the mounting hole 52 in the first plate 20. The second end 192 may be disposed opposite the first end 190. The second end 192 may be coupled to the cover portion 122. For example, the second end 192 may be received in the cover portion mounting hole 144 of the driver 30.

The bushing 34 may extend through the center hole 40 of the first plate 20. The bushing 34 may have a bushing body 200 and a bushing flange 202. The bushing body 200 may extend around the axis 18 and may be received in the center hole 40 of the first plate 20. The bushing body 200 may at least partially define a bushing hole 204 that may receive the shaft portion 120 of the driver 30. The bushing flange 202 may be disposed proximate an end of the bushing body 200. The bushing flange 202 may extend around the bushing body 200 and may extend away from the axis 18. For example, the bushing flange 202 may be disposed substantially perpendicular to the axis 18 in one or more embodiments. The bushing flange 202 may inhibit axial movement of the bushing 34 along the axis 18 in a direction that extends away from the second plate 22. The bushing flange 202 may also support the biasing member 32. For instance the biasing member 32 may be disposed on the bushing flange 202 between the bushing flange 202 and the first cover portion wall 140. In addition, the bushing flange 202 may help retain the pawl springs 28 in the pawl slots 44. For example, the bushing flange 202 may partially overlap a spring slot 46 such that the pawl springs 28 may be at least partially disposed between the bushing flange 202 and the first plate 20.

The clip 36 may secure the driver 30 to the recliner mechanism 16. The clip 36 may configured as a ring that may receive an end of the driver 30. The clip 36 may be disposed proximate or may engage the bushing 34. For example, the clip 36 may engage an end of the bushing body 200 that may be disposed opposite the bushing flange 202. The clip 36 may inhibit axial movement of the driver 30 while permitting the driver 30 to rotate about the axis 18. The clip 36 may be spaced apart from and may not engage the second plate 22 when installed on the driver 30.

Figure 7:
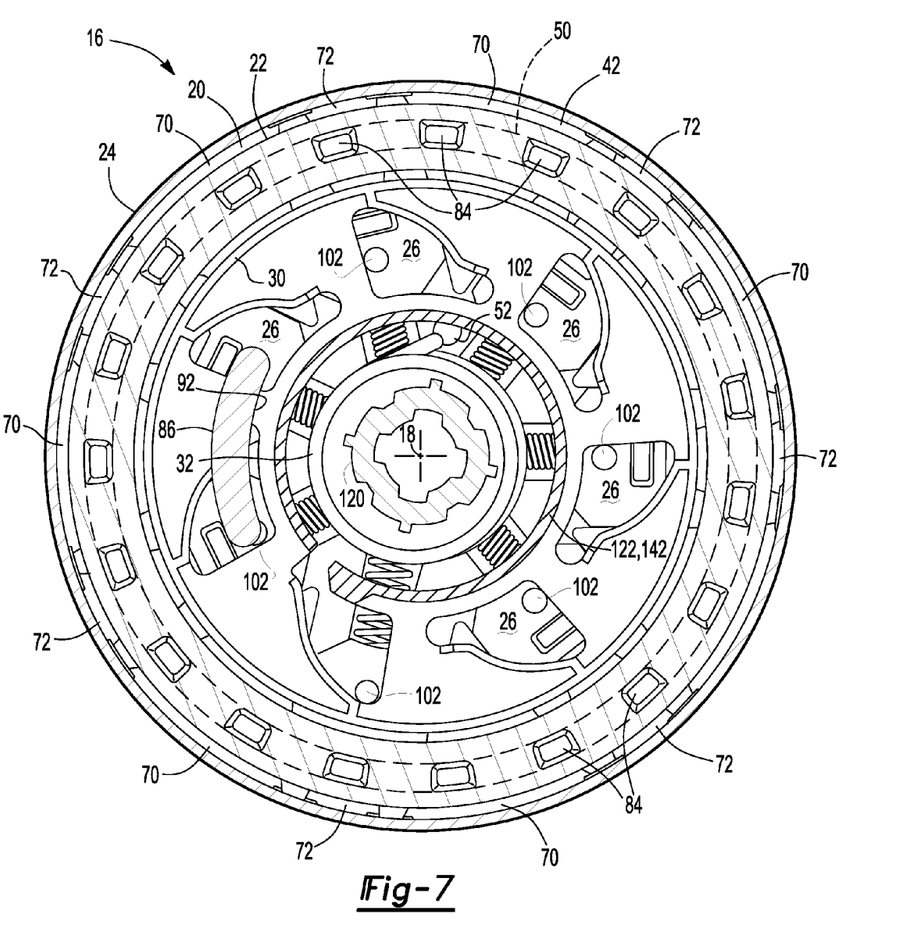
FIG. 7 is a section view of the recliner mechanism showing a pawl in a fully extended position and another pawl in a partially extended position.
Figure 8:
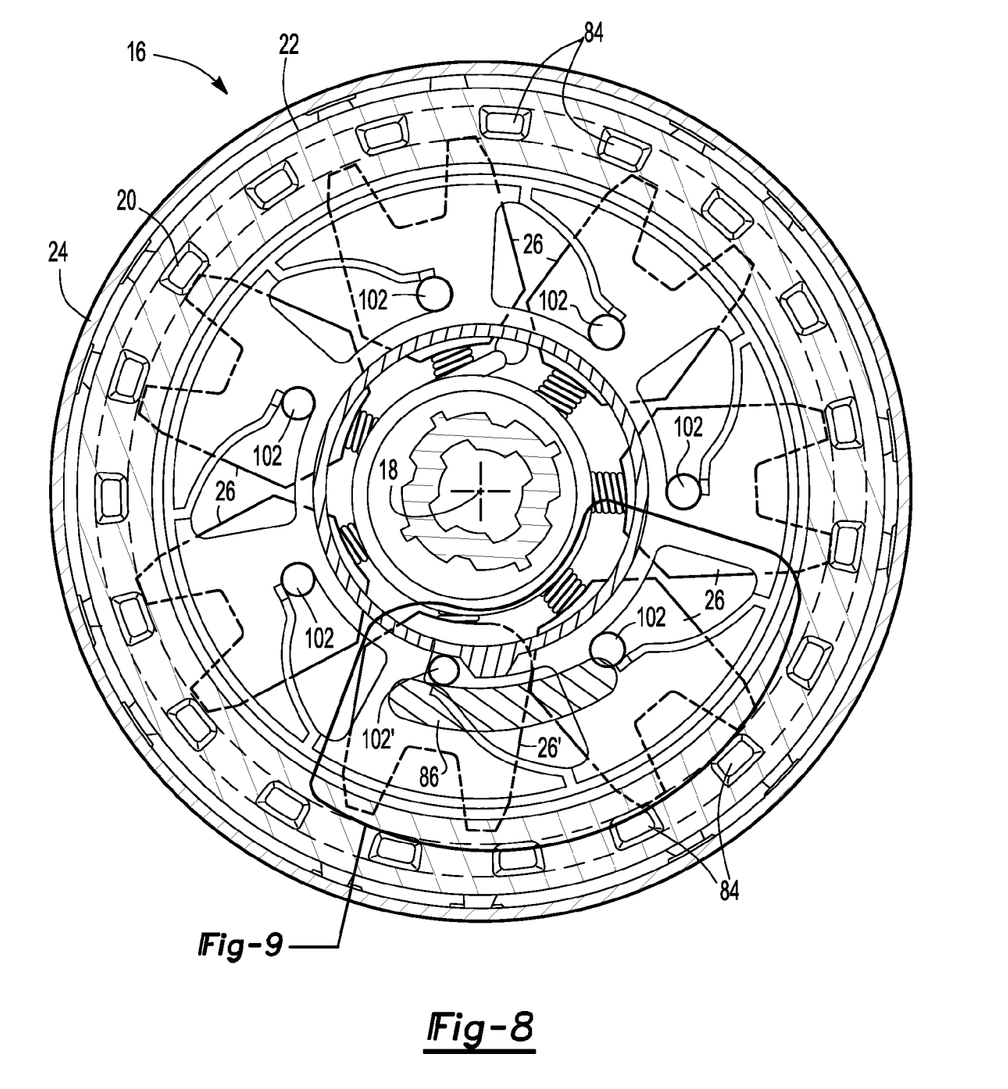
FIG. 8 is a section view of the recliner mechanism showing the driver and all pawls in a refracted position.

Referring to FIGS. 7, 8 and 12, operation of the recliner mechanism 16 will now be discussed in more detail.

In FIGS. 7 and 12, the recliner mechanism 16 is shown with in a locked position in which the second plate 22 is inhibited from rotating about the axis 18 with respect to the first plate 20 by one or more pawls. As is best shown in FIG. 11, the pawls 26, 26' are designated with letters A through G to facilitate the discussion below. In FIGS. 7 and 12, pawl A is shown in a fully extended position in which the master and slave pins 104, 106 extend between teeth 84 on the second plate 22 and into pawl tooth openings 48 on the first plate 20. As such, the master and slave pins 104, 106 of this fully extended pawl 26, 26' are both under a double shear load and inhibit rotation of the second plate 22. Pawl D is shown in a partially extended position in which its master and slave pins 104, 106 extend between teeth 84 on the second plate 22 but not into pawl tooth openings 48 on the first plate 20 due to the position of the teeth 84, which are offset from and partially block the master pin 104 from entering a pawl tooth opening 48. As such, the master and slave pins 104, 106 of this partially extended pawl 26 are both under a single shear load and also inhibit rotation of the second plate 22. Pawls B, C, E, F, and G are shown in or near a refracted position in which the master and slave pins 104, 106 do not extend between teeth 84 on the second plate 22 or into pawl tooth openings 48 on the first plate 20.

The pawls 26, 26' may move from the positions shown in FIGS. 7 and 12 to the refracted position shown in FIG. 8 by rotating the driver 30. Sufficient rotation of the driver 30 about the axis 18 in the counterclockwise direction may cause the cam pins 102, 102' of any extended pawl 26, 26' (such as pawl A) or partially extended pawl (such as pawl D) to follow or slide along the first ramp surface 170 and second ramp surface 180 of the pawl actuation opening 150. The force exerted by the driver 30 on the cam pins 102, 102' may overcome the biasing force exerted by the pawl springs 28 and actuate the pawls 26 toward the axis 18. Sufficient rotation of the driver 30 may cause any extended or partially extended pawls 26, 26' to retract and disengage the teeth 84 on the second plate 22 or not be disposed between the teeth 84 on the second plate 22, which may allow the second plate 22 to rotate with respect to the first plate 20.

Extending the pawls may be accomplished by allowing the driver 30 to rotate in the opposite direction than was employed to retract the pawls 26, 26'. For example, the release or rotation of the driver 30 in the clockwise direction from the perspective shown in FIG. 8 may allow the pawls 26, 26' to move from the retracted position toward the extended position to inhibit rotational movement of the second plate 22. Such rotation may be due to the biasing force exerted by the biasing member 32. The biasing force exerted by the pawl springs 28 against the pawls 26, 26' may actuate the pawls 26, 26' away from the axis 18. The positioning of the teeth 84 on the second plate 22 may allow some, but not all of the pawls 26, 26' to extend between the teeth 84. In at least one embodiment, only one pawl 26, 26' may advance to the fully extended position while one other pawl or more than one other pawl may extend to the partially extended position.

Extension of the pawls may be inhibited when the driver 30 is in a recliner open position. In the recliner open position, rotation of the driver 30 may be inhibited, which in turn may inhibit extension of the pawls 26, 26' from the retracted position.

Referring to FIG. 8, the driver 30 is shown in the recliner open position and positioned such that the dump ramp protrusion 86 interferes with movement of the pawl 26' that has a cam pin 102' that extends into the pawl actuation opening 150 of the driver 30 that has the notch 184. More specifically, when the second plate 22 is rotated such that the dump ramp protrusion 86 is disposed over or adjacent to the notch 184 such that dump ramp protrusion 86 engages a cam pin 102' that is received in the notch 184 (e.g., the dump ramp protrusion 86 is disposed between that cam pin 102' and the set of teeth 84). As such, the cam pin 102' cannot fit between the dump ramp protrusion 86 and the first bottom surface 172 and the cam pin 102' is trapped in the notch 184 by the dump ramp protrusion 86, which may inhibit rotation of the driver 30 and may hold the driver 30 in the recliner open position with all pawls 26, 26' retracted. The recliner open position may be disengaged once the second plate 22 rotates to a position in which the dump ramp protrusion 86 does not extend over the notch 184.

Referring to FIG. 12 exemplary pawl positions are shown in which rotation of the recliner mechanism 16 is inhibited. There are additional pawl positions in which rotation of the recliner mechanism 16 may be inhibited other than that shown in FIG. 12, but in each case one pawl may be disposed in a fully extended position and another pawl may be disposed in a partially extended position. The combination of a fully extended pawl and at least one partially extended pawl may result in zero chuck. Moreover, under high load conditions, a pawl 26, 26' that was partially extended may either move to the fully extended position or more than one pawl 26, 26' may extend to the partially extended position depending on the loading direction. As such, more than one pawl 26, 26' may be partially extended and one or more pawls 26, 26' may not be at least partially extended. In either case, the extension of the pawls may further help inhibit rotation of the second plate 22.

The following table summarizes combinations of fully extended pawls and partially extended pawls that may be employed.

| Fully Extended | Partially Extended | Not Partially or Fully Extended |
|---|---|---|
| A | D | B, C, E, F, G |
| B | E | A, C, D, F, G |
| C | F | A, B, D, E, G |
| D | G | A, B, C, E, F |
| E | A | B, C, D, F, G |
| F | B | A, C, D, E, G |
| G | C | A, B, D, E, F |

In FIG. 12, pawl A is in a fully extended position, pawl D is in a partially extended position, and the remaining pawls are not partially or fully extended. As such, pawls A and D are positioned to inhibit rotation of the second plate 22 with respect to the first plate 20.

A pawl that is in a fully extended position may not be disposed adjacent to a pawl that is partially extended. For instance, at least two pawls 26, 26' separate a fully extended pawl from a partially extended pawl in either a clockwise or counterclockwise direction. Moreover, a fully extended pawl may not be disposed directly opposite a partially extended pawl in one or more embodiments. As such, fully and partially extended pawls may be actuated away from the axis 18 along different axes that may not coaxially arranged or disposed directly opposite each other. In other embodiments, a pawl that is in a fully extended position may be disposed adjacent to a pawl that is partially extended.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A recliner mechanism comprising:
   a first plate having a set of pawl slots, a ring groove that extends around the set of pawl slots, and a set of pawl tooth openings that extend from the ring groove and are disposed opposite the set of pawl slots;
   a second plate that is rotatable about an axis with respect to the first plate, the second plate having a center hole that extends through the second plate and a set of teeth that is received in the ring groove;
   a set of pawls, wherein each member of the set of pawls is received in a corresponding member of the set of pawl slots; and
   a unitary driver that is at least partially received in the center hole and that engages each member of the set of pawls, wherein the driver has a shaft portion that extends through the first plate, a cover portion that extends from the shaft portion, and a flange portion that extends from the cover portion and is completely spaced apart from the shaft portion, and the driver actuates the set of pawls when the driver rotates about the axis.

2. The recliner mechanism of claim 1 wherein each member of the set of pawls has a cam pin that engages the driver.

3. The recliner mechanism of claim 2 wherein the driver has a set of pawl actuation openings that is arranged around the axis, wherein each member of the set of pawl actuation openings receives the cam pin of a corresponding member of the set of pawls.

4. The recliner mechanism of claim 1 wherein the cover portion extends around the shaft portion, the flange portion extends around the cover portion, a set of pawl actuation openings is provided in the flange portion, and the flange portion extends around the axis and the shaft portion.

5. The recliner mechanism of claim 4 wherein the shaft portion is disposed in a center hole of the first plate and the center hole of the second plate.

6. The recliner mechanism of claim 5 wherein the cover portion is disposed in the center hole of the second plate and is not disposed in the center hole of the first plate.

7. The recliner mechanism of claim 4 wherein the flange portion extends from an end of the cover portion toward the set of teeth of the second plate.

8. The recliner mechanism of claim 4 further comprising a biasing member that is disposed inside the cover portion between the shaft portion and the flange portion.

9. A recliner mechanism comprising:
   a first plate having a center hole that extends through the first plate, a ring groove that extends around the center hole, a set of pawl slots that extend from the ring groove toward the center hole, and a set of pawl tooth openings that extend from the ring groove toward an outer surface of the first plate;
   a second plate that is rotatable about an axis with respect to the first plate, the second plate having a center hole and a set of teeth that is received in the ring groove;
   a set of pawls, wherein each member of the set of pawls has a cam pin and is received in a corresponding member of the set of pawl slots; and
   a driver that actuates the set of pawls when the driver rotates about the axis, the driver including:
      a shaft portion that extends through the center hole of the first plate and is disposed in the center hole of the second plate;
      a cover portion that is disposed in the center hole of the second plate and extends from an end of the shaft portion and around the axis; and
      a flange portion that extends from the cover portion and is disposed between the first plate and the second plate, wherein the flange portion has a set of pawl actuation openings that each receive a cam pin of a corresponding member of the set of pawls.

10. The recliner mechanism of claim 9 further comprising a biasing member that exerts a biasing force on the driver, wherein the biasing member has a first end that is coupled to the first plate and a second end that is disposed opposite the first end and that is coupled to the cover portion.

11. The recliner mechanism of claim 10 wherein the first plate has a mounting hole that receives the first end of the biasing member and the cover portion has a first cover portion wall that extends from the shaft portion and that has a cover portion mounting hole that receives the second end of the biasing member.

12. The recliner mechanism of claim 11 wherein the cover portion has a second cover portion wall that extends around the axis from the first cover portion wall to the flange portion, wherein the biasing member is disposed between the shaft portion and the second cover portion wall.

13. The recliner mechanism of claim 11 further comprising a bushing that extends through the center hole of the first plate and has a bushing flange, wherein the biasing member is disposed on the bushing flange between the bushing flange and the first cover portion wall.

14. The recliner mechanism of claim 13 further comprising a set of pawl springs received in the first plate, wherein each member of the set of pawl springs urges a corresponding pawl away from the axis, wherein each member of the set of pawl springs is at least partially disposed between the bushing flange and the first plate.

15. A recliner mechanism comprising:
   a first plate having a ring groove, a set of pawl slots disposed adjacent to the ring groove, and a set of pawl tooth openings disposed adjacent to the ring groove;
   a second plate that is rotatable about an axis with respect to the first plate, the second plate having a center hole, a dump ramp protrusion that is completely spaced apart from the center hole, and a set of teeth that is received in the ring groove;
   a set of pawls, wherein each member of the set of pawls is received in a member of the set of pawl slots; and
   a driver that actuates the set of pawls when the driver rotates about the axis;
   wherein the set of pawls is moveable between a locked position in which the second plate is inhibited from rotating about the axis with respect to the first plate and a retracted position in which the set of pawls are retracted toward the axis and do not extend into the ring groove, wherein the set of pawls is inhibited from moving from the retracted position to the locked position when the dump ramp protrusion inhibits at least one member of the set of pawls from moving away from the axis.

16. The recliner mechanism of claim 15 wherein the dump ramp protrusion extends toward the first plate and has an inner surface is spaced apart from the center hole of the second plate.

17. The recliner mechanism of claim 15 wherein the dump ramp protrusion has an inner surface that faces toward the axis and is concave with respect to the axis, wherein the inner surface engages one member of the set of pawls to hold the set of pawls in the retracted position.

18. The recliner mechanism of claim 17 wherein each member of the set of pawls has a cam pin that extends through a corresponding pawl actuation opening in the driver, wherein the inner surface engages the cam pin of at least one member of the set of pawls to hold the set of pawls in the retracted position.

19. The recliner mechanism of claim 15 wherein the driver has a set of pawl actuation openings, wherein one member of the set of pawl actuation openings has a different configuration than other members of the set of pawl actuation openings, and wherein the dump ramp protrusion engages the pawl disposed in the pawl actuation opening having the different configuration to hold the set of pawls in the retracted position.

20. The recliner mechanism of claim 19 wherein the pawl actuation opening having the different configuration has a first bottom surface and a notch that is disposed closer to the axis than the first bottom surface, wherein the dump ramp protrusion hold the set of pawls in the retracted position when a cam pin of a member of the set of pawls is disposed in the notch and the dump ramp protrusion is positioned to hold the cam pin in the notch.

* * * * *